(12) United States Patent
Noma et al.

(10) Patent No.: US 7,824,631 B2
(45) Date of Patent: Nov. 2, 2010

(54) NANOCARBON GENERATION EQUIPMENT

(75) Inventors: Tsuyoshi Noma, Yokohama (JP);
Hidetoshi Ibe, Tokyo (JP); Eiichi Sugiyama, Yokohama (JP); Tadashi Imai, Yokohama (JP); Kazutaka Kojo, Yokohama (JP); Kiyoshi Imai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 12/045,212

(22) Filed: Mar. 10, 2008

(65) Prior Publication Data

US 2008/0260606 A1 Oct. 23, 2008

(30) Foreign Application Priority Data

Apr. 23, 2007 (JP) ............... 2007-113216

(51) Int. Cl.
*B01J 19/00* (2006.01)
*B01J 8/02* (2006.01)
(52) U.S. Cl. ............ 422/198; 422/212; 422/219; 423/447.3; 423/453; 423/458
(58) Field of Classification Search ........ 422/198, 422/212, 219; 423/447.3, 453, 458
See application file for complete search history.

(56) References Cited

U.S. PATENT DOCUMENTS

| | | | | |
|---|---|---|---|---|
| 3,617,226 A | * | 11/1971 | List et al. ............ | 422/199 |
| 4,351,820 A | * | 9/1982 | Thirion ............... | 423/588 |
| 4,548,706 A | * | 10/1985 | Papadopoulos et al. | 208/130 |
| 4,964,694 A | * | 10/1990 | Oohashi et al. ........ | 385/128 |
| 5,102,647 A | * | 4/1992 | Yamada et al. ........ | 423/447.3 |
| 6,402,899 B1 | * | 6/2002 | Denes et al. .......... | 204/164 |
| 7,276,283 B2 | * | 10/2007 | Denes et al. .......... | 428/403 |

FOREIGN PATENT DOCUMENTS

| | | |
|---|---|---|
| JP | 11-61158 | 3/1999 |
| JP | 2007031547 A * | 2/2007 |

OTHER PUBLICATIONS

Machine translation of JP-2007031547A—Jan. 26, 2010.*
U.S. Appl. No. 11/902,289, filed Sep. 20, 2007, to Sugiyama et al.

* cited by examiner

*Primary Examiner*—Walter D Griffin
*Assistant Examiner*—Huy-Tram Nguyen
(74) *Attorney, Agent, or Firm*—Finnegan, Henderson, Farabow, Garrett & Dunner, L.L.P.

(57) ABSTRACT

A nanocarbon generation equipment designed such that organic processed materials can be quickly thermally decomposed therein and the decomposed materials are then quenched and liquefied to obtain liquefied materials is disclosed. This equipment comprises thermal reactor for quickly thermally decomposing the organic processed materials, apparatus for recovering the liquefied materials which are liquefied through quenching of thermally decomposed organic processed materials, a rotary furnace to be filled with a reducing atmosphere and loaded with hydrocarbons to be obtained through vaporization of liquefied materials after impurities contained in the liquefied materials are removed, and metal balls made of a metal selected from stainless steel, iron, nickel, chromium and an optional combination thereof, wherein the hydrocarbon introduced into the rotary furnace is decomposed into carbon and hydrogen, thus enabling nanocarbon to be produced through vapor-phase growth.

13 Claims, 4 Drawing Sheets

NANOCARBON GENERATION EQUIPMENT

CROSS-REFERENCE TO RELATED APPLICATIONS

This application is based upon and claims the benefit of priority from prior Japanese Patent Application No. 2007-113216, filed Apr. 23, 2007, the entire contents of which are incorporated herein by reference.

BACKGROUND OF THE INVENTION

1. Field of the Invention

This invention relates to a nanocarbon generation equipment which is designed such that thermally decomposable organic processed materials such as biomass and waste can be rapidly thermally decomposed therein, then quenched and liquefied.

2. Description of the Related Art

In recent years, in view of the need to cope with problems relating to the environment, energy material resources, there have been developed techniques for effectively utilizing various kinds of waste such as industrial waste, wherein the waste is appropriately treated so as to extract energy or substances from the waste while avoiding the discharge of environmental contaminants. As for specific examples of such waste-processing techniques, there is known one which is disclosed in JP-A 11-61158 (KOKAI) for example.

JP-A 11-61158 discloses a technique wherein plastic is fused in a thermal decomposition tank to obtain fused plastic, which is then liquid phase-contacted with a primary catalytic layer consisting of activated carbon to thereby thermally decompose the plastic, thus generating thermally decomposed gas. This thermally decomposed gas is then vapor phase-contacted with a secondary catalytic layer of a secondary catalyst column which is communicated with an upper interior portion of the thermal decomposition tank, thereby refining hydrocarbon gas which is of softened state and of small molecular weight.

However, this conventional technique to treat organic processed materials is accompanied with various problems as explained below. Namely, since this conventional technique is a batch treatment using a high-temperature furnace, it takes a lot of time before carbon can be taken out of the furnace after a series of processes including a step of loading the furnace with a catalyst and, after finishing the reaction, a step of cooling the interior of furnace. Further, if carbon is taken out of the furnace when the temperature of carbon is still heated to a high temperature, there is a risk of burning of carbon. Furthermore, since the reaction is performed in a reducing atmosphere, it may become difficult to maintain the reducing atmosphere if the process is to be performed on a large scale. Additionally there is a problem that if the process is to be performed on a large scale, the introduction of a catalyst as well as the continuous removal of carbon product may become difficult.

BRIEF SUMMARY OF THE INVENTION

An object of the present invention is to provide a nanocarbon generation equipment which makes it possible to perform the removal of carbon product within shorter time and more safely as compared with the conventional equipment, and to easily perform the introduction of a catalyst into the equipment and the continuous removal of carbon product from the equipment even if the process is increased in scale, thus realizing mass production of nanocarbon.

According to the present invention, there is provided a nanocarbon generation equipment which is designed such that organic processed materials can be quickly thermally decomposed therein and the decomposed materials are then quenched and liquefied to obtain liquefied materials, the nanocarbon generation equipment comprising: thermal decomposition means for quickly thermally decomposing the organic processed materials; apparatus for recovering the liquefied materials which are liquefied through quenching of thermally decomposed organic processed materials; a rotary furnace which is designed to be filled with a reducing atmosphere and loaded with hydrocarbons to be obtained through vaporization of liquefied materials after impurities contained in the liquefied materials are removed; and metal balls made of a metal selected from stainless steel, iron, nickel, chromium and an optional combination thereof; wherein the hydrocarbon introduced into the rotary furnace is decomposed into carbon and hydrogen, thus enabling nanocarbon to be produced through vapor-phase growth.

Further, according to the present invention, there is provided a nanocarbon generation equipment which is designed such that organic processed materials can be quickly thermally decomposed therein and the thermally decomposed gases consisting of hydrocarbons are used, the nanocarbon generation equipment comprising: a thermal reactor for quickly thermally decomposing the organic processed materials; a rotary furnace which is designed to be filled with a reducing atmosphere and loaded with hydrocarbons consisting of the thermally decomposed gases obtained through thermal decomposition of the organic processed materials; and metal balls made of a metal selected from stainless steel, iron, nickel, chromium and an optional combination thereof; wherein the hydrocarbon introduced into the rotary furnace is decomposed into carbon and hydrogen, thus enabling nanocarbon to be produced through vapor-phase growth.

DETAILED DESCRIPTION OF THE INVENTION

Figure 1:
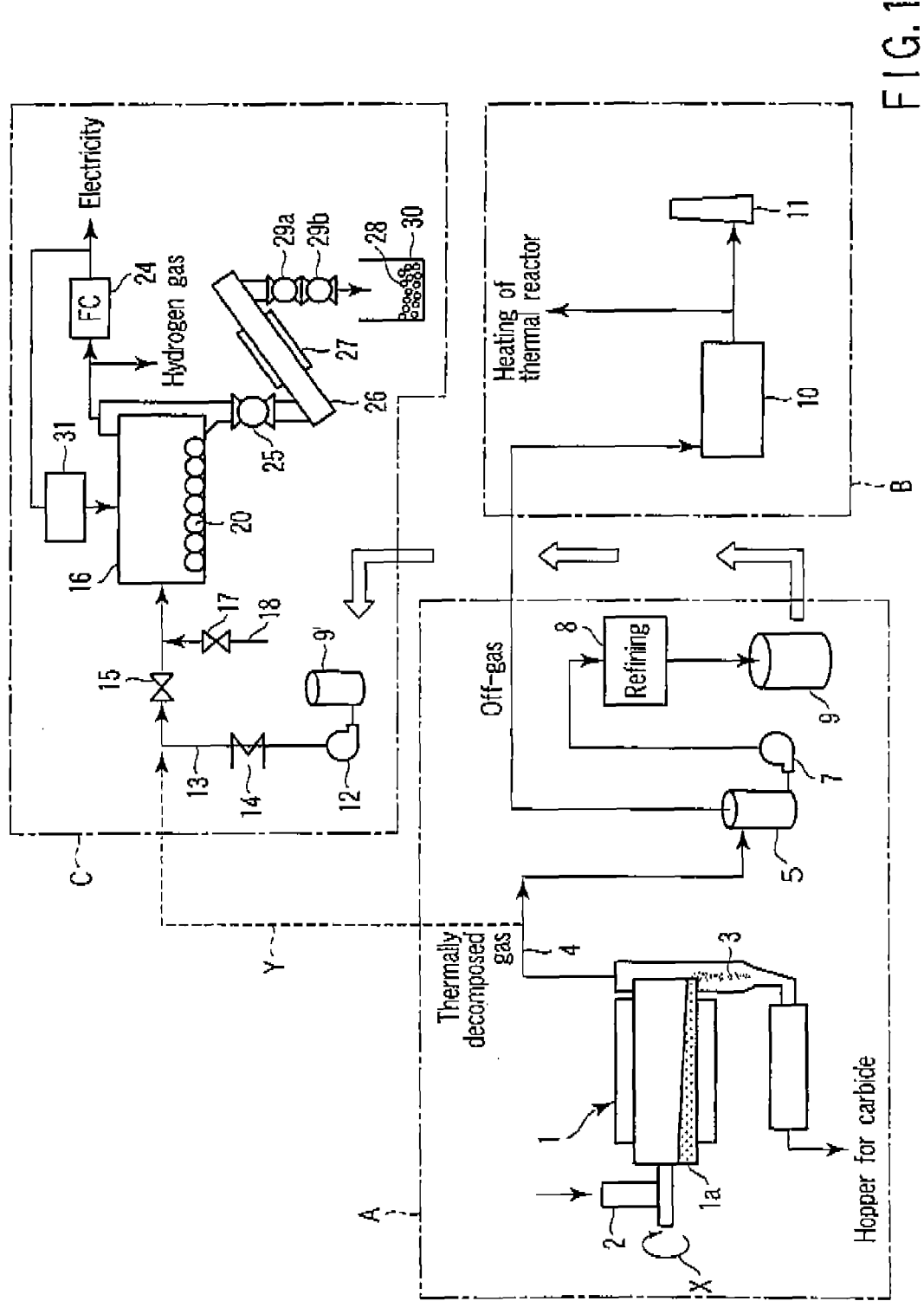
FIG. 1 is a process flowchart of the nanocarbon generation equipment according to a first embodiment of the present invention.

Next, the nanocarbon generation equipment according to the present invention will be further explained in detail.

(1) As described above, the present invention (a first invention) is directed to a nanocarbon generation equipment wherein organic processed materials are enabled to be thermally decomposed quickly and the decomposed materials are then quenched and liquefied to obtain liquefied materials, the nanocarbon generation equipment being constituted by thermal decomposition means; apparatus for recovering; a rotary furnace; and metal balls made of a metal selected from stainless steel, iron, nickel, chromium and an optional combination thereof; wherein the production of nanocarbon is carried out through vapor-phase growth.

According to this first invention constructed as described above, it is possible to perform the removal of carbon product within a shorter time and more safely as compared with the conventional equipment. Further, even if the process is increased in scale, it is possible to easily perform the introduction of a catalyst into the equipment and the continuous removal of carbon product from the equipment. Furthermore, since the interior of the rotary furnace is kept in a reducing atmosphere, it is possible to prevent the surface of metal balls from being deposited with a passive state film (oxide film).

It should be noted that the term "quickly" in the present invention means a period of not more than about 5-6 seconds and differs from the ordinary thermal decomposition in thermal decomposition rate. This quick thermal decomposition is effective in recovering a large quantity of liquefied product. For example, it has been confirmed that when the ratio of liquefied material produced relative to entire product (a total of produced gas and liquefied material produced) is represented by the ordinate and the reaction time is represented by the abscissa in a graph, the ratio of liquefied material produced is caused to decrease proportionally with the progress of reaction time. Accordingly, if it is desired to increase the recovery ratio of liquefied product, it would become more effective when the thermal decomposition is performed more quickly.

(2) As described above, the present invention (a second invention) is directed to a nanocarbon generation equipment wherein organic processed materials are enabled to be thermally decomposed quickly and the thermally decomposed gas thus obtained and constituted by hydrocarbon can be employed, the nanocarbon generation equipment being constituted by: a thermal reactor for quickly thermally decomposing the organic processed materials; a rotary furnace which is designed to be filled with a reducing atmosphere; and metal balls; wherein the production of nanocarbon is carried out through vapor-phase growth.

According to this second invention constructed as described above, it is possible to obtain almost the same effects as those of the first invention. It should be noted that the definition of the term "quickly" is the same as described above, so that as the thermal decomposition takes place more quickly, the recovery ratio of liquefied product can be further increased.

(3) In the inventions set forth in aforementioned items (1) and (2), it is more preferable to put super hard balls into the rotary furnace in addition to the metal balls and to mix the super hard balls with the metal balls. In this case, the surface of metal balls is always scraped by the super hard balls, so that the surface of metal balls can be activated, thus making it possible to peel off the carbon that has been deposited on the surface of metal balls.

(4) It is preferable to file the surface of the super hard balls or to file the inner wall of the rotary furnace. By doing so, it is possible to further enhance the effect of peeling the carbon deposited on the surface of metal balls.

(5) It is preferable to make the metal balls hollow in configuration so as to make the bulk density thereof substantially identical with the bulk density of the super hard balls. By doing so, it is possible to homogeneously mix the super hard balls with the metal balls inside the rotary furnace.

(6) In the present invention, the concentration of oxygen inside the rotary furnace should preferably be controlled to the range of 0-3%, more preferably to the range of 0-1%. This limitation is because of the facts that the degree of reduction inside the furnace should preferably be as strong as possible from the viewpoint of preventing the oxidation of catalyst and that the degree of reduction inside the furnace should preferably be as weak as possible from the viewpoint of generating hydrogen.

(7) In the present invention, it is preferable to enable the hydrogen in the off-gas generated in the rotary furnace to reflux inside the rotary furnace, thereby enabling the hydrogen to be utilized for maintaining the reducing atmosphere inside the rotary furnace.

Specific Embodiments:

Next, specific embodiments of the nanocarbon generation equipment according to the present invention will be explained with reference to drawings.

First Embodiment

Figure 2:
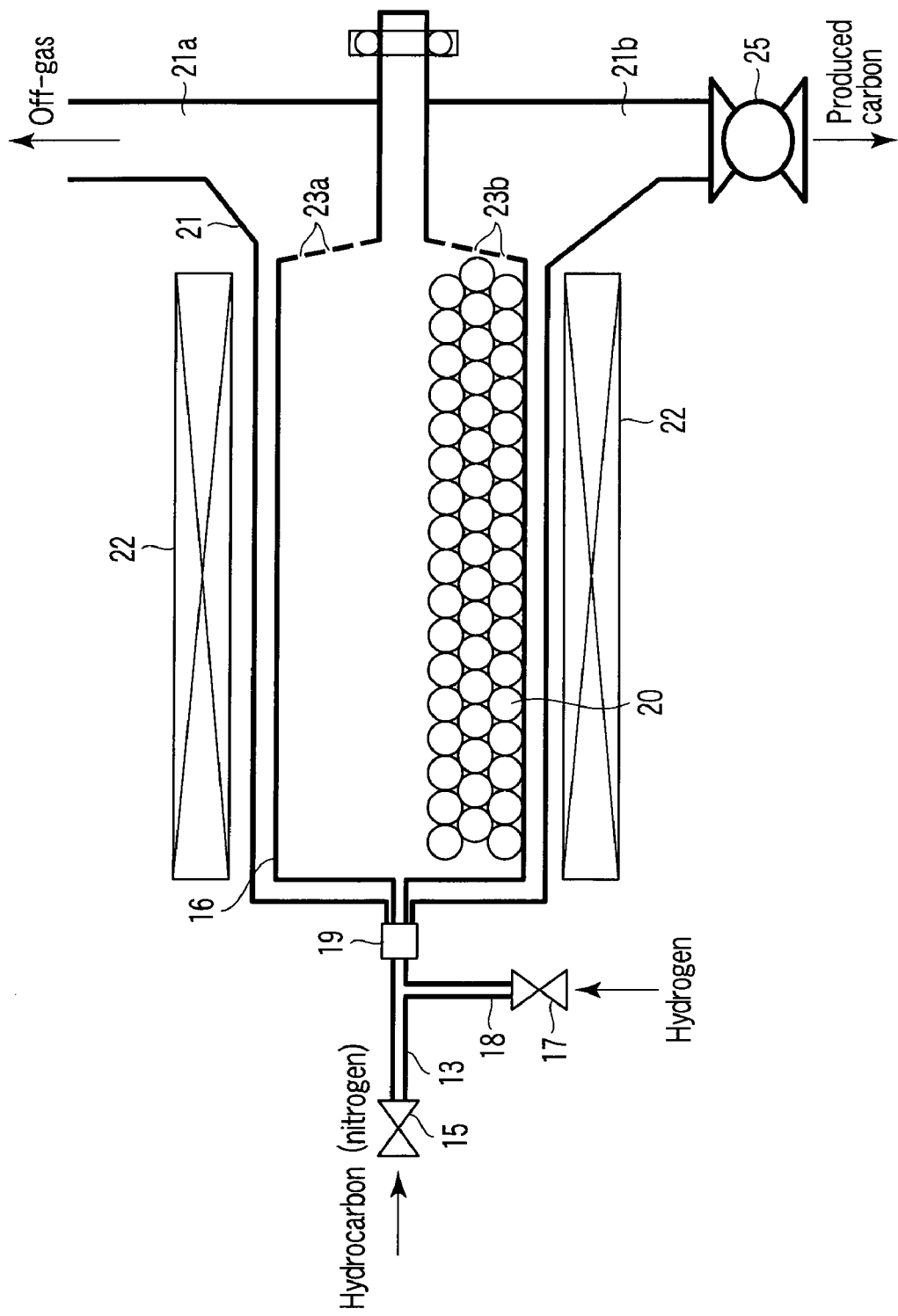
FIG. 2 is an enlarged diagram schematically illustrating the rotary furnace and the peripheral structure thereof, both representing one constituent feature of the nanocarbon generation equipment of FIG. 1.

Referring to FIGS. 1 and 2, FIG. 1 is a process flowchart of the nanocarbon generation equipment according to a first embodiment of the present invention, and FIG. 2 is an enlarged diagram illustrating the rotary furnace and the peripheral structure thereof, both representing one constituent feature of the nanocarbon generation equipment of FIG. 1. This process flowchart is consisted of a block "A" illustrating a process including a step of loading a thermal reactor with a raw material, a step of recovering a liquefied matter and a step of refining the liquefied matter to obtain off-gas; a block "B" illustrating a process including a step of combusting the off-gas that has been obtained in the block "A" and a step of exhausting the combusted gas; and a block "C" illustrating a process including a step of heating and vaporizing bio-oil and a step of refining nanocarbon.

The reference number "1" in the drawing represents a thermal reactor wherein a raw material which has been formed into chips through the crushing of woody biomass resource employed as organic processed materials is subjected, together with a catalyst, to quick thermal decomposition at a temperature of about 500° C. This thermal reactor 1 comprises a drum 1a which is designed to be rotated as shown by an arrow "X" and loaded therein with a large number of scraper balls (not shown). Raw material and the catalyst (for example, Mo/Ni/MgO catalyst particles) are introduced through a hopper 2 into this thermal reactor 1. As a result of the quick thermal decomposition, carbide 3 is enabled to be taken up from the bottom of the thermal reactor 1 and to be transferred to a carbide hopper, while thermally decomposed gas containing impurities is enabled to be released from an upper portion of the carbide hopper and discharged from a piping 4.

A condenser 5 is disposed at a midway of the piping 4. The thermally decomposed gas generated from this quick thermal decomposition process is cooled and condensed into liquid. As a result, the liquefied product thus obtained is sent by means of a pump 7 to a filter 8 and filtered to obtain bio-oil, which is subsequently reserved in a storage tank 9. On the other hand, the off-gas ($H_2$, CO, etc.) generated on the occasion of cooling the thermally decomposed gas is sent to a combustion furnace 10 and then discharged from an exhaust column 11. The heat generated on the occasion of the combustion in the combustion furnace 10 is utilized in the thermal reactor 1. Herein, apparatus for recovering is constituted by the condenser 5, the piping 4, the pump 7, the filter 8 and the storage tank 9. It should be noted that the storage tank 9 employed in the block "A" is not the same in function as the storage tank 9' employed in the block "B". Namely, the storage tank 9 is designed to temporarily accommodate bio-oil in the course of the circulation thereof.

The biogas from the storage tank 9 is sent by means of a pump 12 to a heat exchanger 14 mounted on a piping 13 so as to be heated and vaporized, thereby generating hydrocarbon gas. This hydrocarbon gas is transferred via a valve 15 mounted on the piping 13 to a rotary furnace 16, the interior of which is kept away from air and filled with a reducing atmosphere of high temperature. The piping 18 equipped with a valve 17 is connected with the aforementioned piping 13, so that hydrogen is enabled to be fed from this piping 18 to the piping 13. As shown in FIG. 2, one end of the rotary furnace 16 is connected, by means of a rotary joint 19, with the piping 13, thereby enabling the rotary furnace 16 to rotate.

Metal balls 20 made of SUS are accommodated in the rotary furnace 16. This rotary furnace 16 is surrounded by a housing 21 equipped with passageways 21a and 21b. A heating member 22 constituted by an electric heater, etc. is disposed on the outer circumferential surface of the housing 21. The interior of the rotary furnace 16 is heated to 550° C. on the occasion of hydrogen reduction and to 750° C. on the occasion of producing carbon. The other end of the rotary furnace 16 is constructed such that a large number of holes 23a and 23b are formed in the upper and lower end faces thereof respectively, so that off-gas is enabled to escape from the holes 23a and to pass, via the passageway 21a, to a fuel cell (FC) 24 for example and soot is enabled to escape from the holes 23b and to fall downward through the passageway 21b.

The passageway 21b of the housing 21 is connected through a partitioning ball valve 25 with a screw conveyer 26. This screw conveyer 26 is inclined upward so as to make the right end portion thereof higher than the left end portion thereof (on the drawing). A cooling jacket 27 is attached to the outer circumferential surface of the screw conveyer 26. The nanocarbon 28 that has been produced in the rotary furnace 16 is transferred, via the ball valve 25, to the screw conveyer 26. Herein, the nanocarbon 28 is delivered from the lower left side of screw conveyer 26 to the upper right side of screw conveyer 26 and then cooled by the cooling jacket 27. Thereafter, the nanocarbon 28 thus cooled is passed through a double structure consisting of partitioning ball valves 29a and 29b and then recovered by a recovering vessel 30. In this case, these ball valves 29a and 29b are alternately closed and opened. It should be noted that the reference number 31 in the drawing denotes a combustion equipment for combusting the off-gas to be delivered from the piping disposed downstream side of the fuel cell 24, the resultant gas being enabled to be introduced into the rotary furnace 16. However, this combustion equipment 31 is not necessarily required to be employed.

In the rotary furnace 16, the hydrocarbon is decomposed into carbon and hydrogen according to the following procedure.

Step 1: the inner temperature of the rotary furnace 16 is heated up to 550° C.

Step 2: the valve 17 is opened to allow hydrogen to pass through the rotary furnace 16, thereby activating the interior of rotary furnace 16.

Step 3: the valve 17 is closed to stop the supply of hydrogen.

Step 4: the valve 15 is opened, allowing nitrogen to be fed to the rotary furnace 16 and, at the same time, the inner temperature of rotary furnace 16 is raised to 750° C.

Step 5: In place of nitrogen, hydrocarbon is fed to the rotary furnace 16, thereby producing nanocarbon.

Step 6: the valve 15 is closed to stop the supply of hydrocarbon and the nanocarbon 28 that has been produced is recovered in the recovering vessel 30 while continuing the feeding of nitrogen.

According to the nanocarbon generation equipment of the first embodiment, it is possible to obtain the following effects.

(1) Since the interior of the rotary furnace 16 is maintained in a reducing atmosphere of high temperature by the introduction of hydrogen into the rotating rotary furnace 16 while keeping air away therefrom, it is possible to prevent the surface of metal balls 20 made of SUS and accommodated in the rotary furnace 16 from being deposited with a passive state film (oxide film). Therefore, the hydrocarbon gas can be effectively contacted with the surface of metal balls 20.

(2) Due to the provision of the screw conveyer 26 and the cooling jacket 27 which are arranged on the lower side of the rotary furnace 16, the removal of nanocarbon 28 can be completely carried out taking a shorter period as compared with the conventional equipment without causing the combustion of nanocarbon 28. Further, even if the process is increased in scale, the introduction of a catalyst into the equipment as well as the continuous removal of produced nanocarbon 28 can be satisfactorily performed.

(3) Since the off-gas from the piping which is disposed on the downstream side of fuel cell 24 is enabled to be introduced via the combustion equipment 31 into the rotary furnace 16, the inner temperature of rotary furnace 16 can be raised within a short period.

It should be noted that this first embodiment explains the nanocarbon generation equipment where impurities are contained in the thermally decomposed gas that has been obtained in the thermal reactor. However, when the thermally decomposed gas contains little or no impurities, the recovery means would not be required to be employed, so that hydrocarbon constituting the thermally decomposed gas can be introduced directly into the rotary furnace 16 as indicated by the arrow (dotted line) "Y" in FIG. 1. In this case, since it is possible to omit the condenser constituting the recovery means, the filter and the storage tank, the entire structure of nanocarbon generation equipment can be simplified.

Second Embodiment

Figure 3:
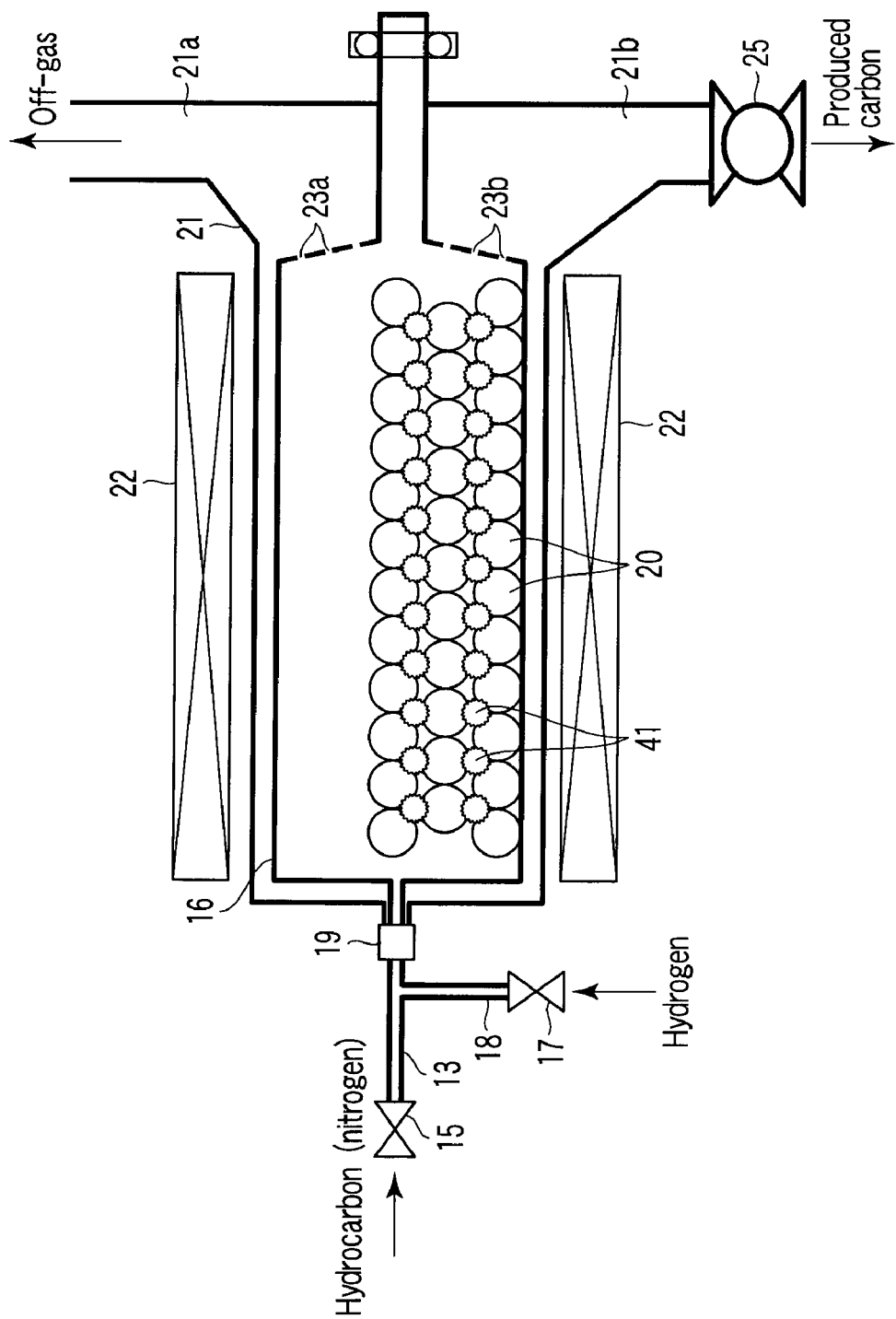
FIG. 3 is an enlarged diagram schematically illustrating the rotary furnace and the peripheral structure thereof, representing one constituent feature of the nanocarbon generation equipment according to a second embodiment of the present invention.

Referring to FIG. 3, it illustrates only the rotary furnace of the nanocarbon generation equipment according to a second embodiment and the peripheral structure thereof. In this embodiment, the same members or portions as those of FIGS. 1 and 2 will be identified by the same reference numbers, thereby omitting the explanation thereof.

This embodiment is featured in that the rotary furnace 16 is loaded therein with a large number of super hard balls 41 made of toughened ceramics in addition to the metal balls 20 made of SUS, these super hard balls 41 being mixed with the metal balls 20.

According to this second embodiment, the surface of metal balls 20 is always scraped by the super hard balls 41, so that the surface of metal balls 20 can be activated, thus making it possible to peel off the carbon that has been deposited on the surface of metal balls 20. It should be noted that, since the inner wall of the rotary furnace 16 may be scraped by the super hard balls 41, it is required to harden the inner wall of rotary furnace 16.

It should be noted that, when the surface of the super hard balls 41 and/or the inner wall of the rotary furnace 16 is filed in addition to the measures of simply introducing the super hard balls 41 into the rotary furnace, the effects of scraping the surface of metal balls 20 can be further enhanced.

Third Embodiment

Although not shown in the drawings, this embodiment is featured in that super hard balls whose surface is filed are introduced, together with the metal balls, into a rotary furnace and, at the same time, the metal balls are made hollow in configuration so as to make the bulk density thereof substantially identical with the bulk density of the super hard balls.

According to this third embodiment, since the bulk density of the metal balls is made identical with the bulk density of the super hard balls, it is possible to homogeneously mix the super hard balls with the metal balls in the rotary furnace.

Fourth Embodiment

Figure 4:
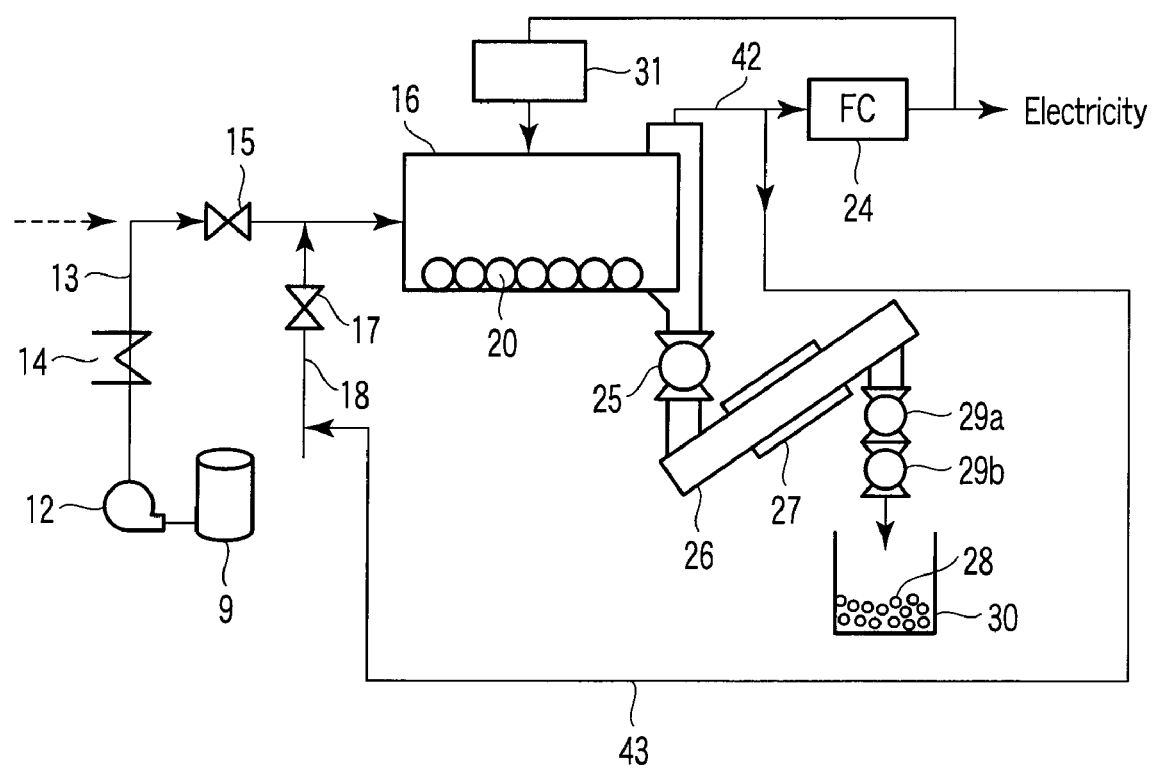
FIG. 4 is a diagram schematically illustrating the rotary furnace and the peripheral structure thereof, representing one constituent feature of the nanocarbon generation equipment according to a fourth embodiment of the present invention.

Referring to FIG. 4, it illustrates a flowchart of the nanocarbon generation equipment according to a fourth embodiment, wherein only the portions corresponding to the block "C" of FIG. 1 are shown. In this embodiment, the same members or portions as those of FIGS. 1 and 2 will be identified by the same reference numbers, thereby omitting the explanation thereof.

As shown in FIG. 4, this embodiment is featured in that a piping 43 is provided so as to permit a piping 42 for connecting the rotary furnace 16 with the fuel cell 24 to connect with the aforementioned piping 18, thereby enabling the hydrogen in the off-gas generated in the rotary furnace 16 to reflux in the rotary furnace 16, thus making it possible to keep the reducing atmosphere inside the furnace. In this case, the concentration of oxygen inside the furnace is controlled to the range of 0-3%. The reason for doing so is as follows. Namely, if the degree of reduction inside the furnace is too strong, the hydrogen-generating reaction is suppressed as a matter of course. Therefore, because of the facts that the degree of reduction inside the furnace should preferably be as strong as possible from the viewpoint of preventing the oxidation of catalyst and the degree of reduction inside the furnace should preferably be as weak as possible from the viewpoint of generating hydrogen, it is necessary to control the degree of reduction to an appropriate range. For the sake of these viewpoints, the concentration of oxygen inside the furnace is set to the aforementioned range. It should be noted that, more preferably, the concentration of oxygen inside the furnace should be confined to the range of 0-1%.

According to this fourth embodiment, since the concentration of oxygen inside the furnace is controlled to the range of 0-3% with viewpoints of preventing the oxidation of catalyst and of generating hydrogen, the hydrogen can be effectively utilized for keeping a reducing atmosphere in the furnace through the refluxing of hydrogen inside the furnace.

It should be noted that, although SUS material is employed as a raw material for the metal balls in the aforementioned embodiments, the raw material for the metal balls is not restricted to SUS but may be selected from iron, nickel, chromium or any combination of these metals.

What is claimed is:

1. A nanocarbon generation equipment designed that organic processed materials can be quickly thermally decomposed therein and the decomposed materials are then quenched and liquefied to obtain liquefied materials, the nanocarbon generation equipment comprising:
   thermal decomposition means for quickly thermally decomposing the organic processed materials;
   apparatus for recovering the liquefied materials which are liquefied through quenching of thermally decomposed organic processed materials;
   a rotary furnace to be filled with a reducing atmosphere and loaded with hydrocarbons to be obtained through vaporization of liquefied materials after impurities contained in the liquefied materials are removed; and
   metal balls made of a metal selected from stainless steel, iron, nickel, chromium and an optional combination thereof;
   wherein the hydrocarbon introduced into the rotary furnace is decomposed into carbon and hydrogen, thus enabling nanocarbon to be produced through vapor-phase growth.

2. The nanocarbon generation equipment according to claim 1, wherein super hard balls are introduced into the rotary furnace in addition to the metal balls and mixed with the metal balls.

3. The nanocarbon generation equipment according to claim 1, wherein an inner wall of the rotary furnace is filed.

4. The nanocarbon generation equipment according to claim 2, wherein the metal balls are made hollow in configuration to make the bulk density thereof substantially identical with the bulk density of the super hard balls.

5. The nanocarbon generation equipment according to claim 1, wherein a concentration of oxygen inside the rotary furnace is controlled to the range of 0-3%.

6. The nanocarbon generation equipment according to claim 1, wherein hydrogen in an off-gas generated in the rotary furnace is refluxed inside the rotary furnace, thereby enabling the hydrogen to be utilized for maintaining the reducing atmosphere inside the rotary furnace.

7. A nanocarbon generation equipment designed that organic processed materials can be quickly thermally decomposed therein and the thermally decomposed gases consisting of hydrocarbons are used, the nanocarbon generation equipment comprising:
   a thermal reactor for quickly thermally decomposing the organic processed materials;
   a rotary furnace to be filled with a reducing atmosphere and loaded with hydrocarbons consisting of the thermally decomposed gases obtained through thermal decomposition of the organic processed materials; and
   metal balls made of a metal selected from stainless steel, iron, nickel, chromium and an optional combination thereof;
   wherein the hydrocarbon introduced into the rotary furnace is decomposed into carbon and hydrogen, thus enabling nanocarbon to be produced through vapor-phase growth.

8. The nanocarbon generation equipment according to claim 7, wherein super hard balls are introduced into the rotary furnace in addition to the metal balls and mixed with the metal balls.

9. The nanocarbon generation equipment according to claim 8, wherein a surface of the super hard balls is filed.

10. The nanocarbon generation equipment according to claim 7, wherein an inner wall of the rotary furnace is filed.

11. The nanocarbon generation equipment according to claim 8, wherein the metal balls are made hollow in configuration to make the bulk density thereof substantially identical with the bulk density of the super hard balls.

12. The nanocarbon generation equipment according to claim 7, wherein a concentration of oxygen inside the rotary furnace is controlled to the range of 0-3%.

13. The nanocarbon generation equipment according to claim 7, wherein hydrogen in an off-gas generated in the rotary furnace is refluxed inside the rotary furnace, thereby enabling the hydrogen to be utilized for maintaining the reducing atmosphere inside the rotary furnace.

* * * * *